(12) United States Patent
Howe et al.

(10) Patent No.: US 11,139,086 B2
(45) Date of Patent: Oct. 5, 2021

(54) CUSTOMIZABLE THIN PLATE FUEL FORM AND REACTOR CORE THEREFOR

(71) Applicant: HOWE INDUSTRIES, LLC, Tempe, AZ (US)

(72) Inventors: Troy M. Howe, Tempe, AZ (US); Steven D. Howe, Tempe, AZ (US)

(73) Assignee: HOWE INDUSTRIES, LLC, Scottsdale, AZ (US)

( * ) Notice: Subject to any disclaimer, the term of this patent is extended or adjusted under 35 U.S.C. 154(b) by 335 days.

(21) Appl. No.: 15/834,922

(22) Filed: Dec. 7, 2017

(65) Prior Publication Data

US 2019/0108920 A1    Apr. 11, 2019

Related U.S. Application Data

(60) Provisional application No. 62/570,637, filed on Oct. 10, 2017.

(51) Int. Cl.
| | |
|---|---|
| *G21C 3/36* | (2006.01) |
| *G21C 3/20* | (2006.01) |
| *G21C 15/06* | (2006.01) |
| *G21C 5/18* | (2006.01) |
| *G21C 5/16* | (2006.01) |
| *G21C 3/64* | (2006.01) |

(Continued)

(52) U.S. Cl.
CPC ............. *G21C 3/36* (2013.01); *G21C 3/20* (2013.01); *G21C 5/16* (2013.01); *G21C 5/18* (2013.01); *G21C 15/06* (2013.01); *B64G 1/408* (2013.01); *G21C 3/626* (2013.01); *G21C 3/64* (2013.01); *G21C 5/126* (2013.01)

(58) Field of Classification Search
CPC ............. G21C 3/00; G21C 3/36; G21C 3/626
See application file for complete search history.

(56) References Cited

U.S. PATENT DOCUMENTS 2,906,683 A * 9/1959 Quackenbush ........ G21C 15/04
376/289
3,189,524 A * 6/1965 Hocker .................... G21C 1/12
376/423

(Continued)

FOREIGN PATENT DOCUMENTS

GB        1330031 A * 9/1973 ............... G21C 3/36

OTHER PUBLICATIONS

Burkes, Douglas E., et al. An Overview of Current and Past W-UO[2] CERMET Fuel Fabrication Technology. No. INL/CON-07-12232. Idaho National Laboratory (INL), 2007. (Year: 2007).*

(Continued)

*Primary Examiner* — Lily C Garner
(74) *Attorney, Agent, or Firm* — FisherBroyles. LLP; Keats Quinalty

(57) ABSTRACT

A customizable thin plate fuel form and reactor core therefor are disclosed. The thin plate fuel will comprise a fuel material embedded within a matrix material, with the entire unit having a coating. The thin plate fuel may be flat or curved and will have flow channels formed within at least the top surface of the fuel plate. The structure of the thin plate fuel will make it easier for coating with Tungsten or any other suitable material that will help contain any byproducts, prevent reactions with the working fluid, and potentially provide structural support to the thin plate fuel.

16 Claims, 10 Drawing Sheets

(51) Int. Cl.
*B64G 1/40* (2006.01)
*G21C 5/12* (2006.01)
*G21C 3/62* (2006.01)

(56) References Cited

U.S. PATENT DOCUMENTS

| | | | | |
|---|---|---|---|---|
| 3,322,636 A * | 5/1967 | Benson | ............ | G21C 1/00 376/174 |
| 3,386,887 A * | 6/1968 | Mogard | ............ | G21C 3/04 376/455 |
| 3,560,339 A * | 2/1971 | McHugh | ............ | G21C 3/18 376/420 |
| 3,728,220 A * | 4/1973 | Prince et al. | ............ | G21C 3/06 376/383 |
| 3,855,061 A * | 12/1974 | Triggiani | ............ | G21C 3/16 376/411 |
| 4,759,911 A * | 7/1988 | Bingham | ............ | G21C 3/042 264/0.5 |
| 5,089,219 A * | 2/1992 | Malloy, III | ............ | G21C 3/30 376/420 |
| 6,190,725 B1 * | 2/2001 | Lee | ............ | G21C 3/20 427/6 |

OTHER PUBLICATIONS

Bokor, Peter C., William L. Kirk, and Richard J. Bohl. "The behavior of fission products during nuclear rocket reactor tests." AIP Conference Proceedings. vol. 217. No. 3. American Institute of Physics, 1991. <https://www.osti.gov/servlets/purl/6492044/>. (Year : 1991).*

* cited by examiner

CUSTOMIZABLE THIN PLATE FUEL FORM AND REACTOR CORE THEREFOR

CROSS-REFERENCE TO RELATED APPLICATION

This application claims priority to U.S. Provisional Application No. 62/570,637, entitled "Fuel Element for a Nuclear Thermal Rocket," which was filed on Oct. 10, 2017 in the names of the inventors herein, and which is incorporated in full herein by reference.

STATEMENT OF GOVERNMENT SUPPORT

This invention was made with government support under Contract Number NNX17CM30P awarded by NASA// Shared Services Center (NSSC). The government has certain rights in the invention.

FIELD OF THE INVENTION

The present invention generally relates to nuclear thermal rockets, and more specifically, to a customizable thin plate fuel form and reactor core therefor.

BACKGROUND OF THE INVENTION

The Nuclear Thermal Rocket (NTR) can enable fast human missions to Mars, affordable human missions to the Moon, and complex, robust robotic missions to the outer planets. The NTR system is simpler than a LOX/LH2 engine, which uses a combination of liquid hydrogen (LH2) fuel and the liquid oxygen (LOX) oxidizer as a propellant, and is inherently safer as well. However, the NTR is a nuclear powered system and, thus, must be shown to be extremely safe, robust in accident scenarios, and affordable. Specifically, both the emission of radioactive species such as Kr-85 (85 Krypton gas) and the loss of uranium fuel into the exhaust stream must be substantially reduced or eliminated.

In 1955, the Los Alamos Scientific Laboratory began the Rover program to develop a solid core nuclear rocket engine. The basic concept was to allow a graphite-fuel based nuclear reactor to reach high temperatures, to cool the reactor with clean hydrogen, and to exhaust the high-speed hydrogen for thrust. In 1963, the Nuclear Engine for Rocket Vehicle Applications (NERVA) began with Aerojet as the prime contractor and Los Alamos as a supporting contributor. The goal of the NERVA program was to transform the nuclear reactor technology developed by Los Alamos and produce a space qualified nuclear engine. Both programs were terminated in 1972. Before termination, however, the Rover/NERVA programs built and tested over 20 reactors/ engines, achieved fuel temperatures in excess of 2550 K, ran a reactor with a peak power of greater than 4000 megawatts, operated a system for over an hour, demonstrated start-up and shut-down operations, and proved that the graphite based reactor core could withstand the extreme conditions of operation. The exhaust of the engine in the final days of the program was calculated to have a specific impulse of near 850 seconds, almost three times the performance of the kerosene engines of the Saturn V and twice that of the soon-to-be-developed LOX/hydrogen engines of the Space Shuttle.

At the time of the Rover/NERVA programs, an alternative fuel form using tungsten cermet composites was also investigated. The GE-710 program in the 1960s and a program at the Argonne National Laboratory (ANL) later, both examined performance of tungsten based fuels for NTR operation. Fuel elements were irradiated and physical characteristics were measured but no reactor was ever tested with a tungsten core. Recently, interest in tungsten based fuel has increased because of the demonstrated capability to retain fission products in the metal matrix so that non-radioactive exhaust may be possible. Tungsten-cermet fuel is potentially a high-endurance fuel and has excellent compatibility with high-temperature hydrogen gas. Tungsten has better thermal conductivity, a higher melting point, and is more resistant to creep deformation at elevated temperatures. Finally, tungsten is more resistant to radiation migration within its matrix and is more resistant to physical changes induced by radiation, such as neutron absorption. It has been previously shown that fission product gases released within a tungsten-cermet matrix can be effectively contained for temperatures up to 1,550° C.

In the late 1980s, The US Strategic Defense Initiative funded an effort to develop a particle bed NTR. Project Timberwind sought to pursue a concept developed at the Los Alamos National Laboratory in the 1950's that would use cylinders containing small particles of uranium carbide, roughly 50 microns in diameter, through which would pass hydrogen coolant. The advantages of the concept were very high thrust-to-weight ratios near 30, i.e. low-mass, compact engines with high Isp. The disadvantages were an inability to match coolant flow to power density in the fuel elements and erosion of the particles with subsequent clogging of the coolant flow paths. The latter issue could cause burn through of the porous frit holding the particles in place.

One final development in the NTR is the potential to use Low Enriched Uranium (LEU) instead of the Highly Enriched Uranium (HEU) used during the Rover/NERVA and Timberwind programs. Studies over the past few years at the Center for Space Nuclear Research (CSNR) at the Idaho National Laboratory (INL) have investigated two fuel forms for the NTR that used LEU: 1) a graphite matrix similar to the composite fuel tested in the Nuclear Furnace during the NERVA program, and 2) a tungsten matrix similar to that tested in the GE710 program in the 1970s. The graphite fuel is attractive in that it requires modest amounts of LEU, is compact in size, and has good thrust-to-weight characteristics. However, the graphite reacts readily with hot hydrogen, may crack during operation, requires an explicit method to remain subcritical on ocean immersion, and has demonstrated significant radioactivity levels in the exhaust. The tungsten fuel is attractive in that it retains the radioactive fission products and the fuel, does not react with hydrogen, is strong, and remains intrinsically subcritical on ocean immersion. However, the tungsten fuel is heavier and requires a significantly larger amount of LEU making it less affordable.

In short, the NERVA engines tested in the 1960s proved the concept feasibility. However, the drawbacks of the graphite fueled design were: (1) The graphite reacts easily with the hot hydrogen so that each flow channel had to be coated with zirconium carbide or molybdenum; (2) The thin coatings cracked or eroded, described as mid-band corrosion, which allowed radioactive fission products and uranium-carbide kernels to escape into the exhaust stream; even the composite fuel form was shown to have mid-band corrosion and leak radioactivity in the Nuclear Furnace tests—composite fuel was never tested in a full-power engine test; (3) The hydrogen feed system required a complex manifold to feed the tie-tubes separately from the fuel elements; (4) The tie-tubes had to be cooled to lower temperatures providing another risk element, i.e. tie-tube burn through, although no tie tubes ever failed during the NERVA tests; and (5) The NERVA engine would reach criticality on ocean immersion on a launch abort if explicit methods were not incorporated into the core such as neutron absorbing wires inserted into the flow channels.

In the 1970s, tungsten fuel was also examined by the Argonne National Laboratory and by the General Electric Company. Results of these programs showed: (1) Tungsten does not interact with the hot hydrogen—this could indicate that no coatings were required on the flow channels allowing for simpler manufacturing methods; (2) Static tests were performed in reactors which demonstrated fission product retention; (3) No mid-band corrosion is expected although no engine tests with flowing hydrogen were ever performed; (4) The core would remain subcritical on ocean immersion by intrinsic methods, i.e. the nuclear physics of the fast spectrum reactor; (5) No tie-tubes are required potential reducing operational risk; and (6) No complex manifold system is required—reducing costs and operational risk.

In the 1980s, the particle bed NTR showed: (1) Very high surface to volume ratios fuel was possible resulting in compact, low mass fuel elements; (2) Ease of manufacture of the fuel elements; and (3) Failure to match coolant flow to power density resulting in fuel element failure at low temperatures.

While the fuel materials have been demonstrated that enable a NTR to produce very high Isp and high thrust, the fuel element geometry may potentially present a problem. The prismatic fuel form, i.e. a hexagonal cross section with axial flow channels, has significant fabrication problems. Recent modeling of the prismatic heat transfer shows that elements function better with an increased number of flow channels, up to 37 or 61, and a decreased thickness of the material web between the channels. Increasing the flow channel number, though, reduces the channel diameter and increases the pressure drop across the core. Consequently, the driving pressure must increase and the overall engine mass increases.

Although the prismatic fuel form was demonstrated to work well in the Rover/NERVA programs, the fuel element was difficult to manufacture with guaranteed quality control. The requirement to apply a coating of zirconium carbide to the inner wall of the flow channels which were 0.1 in in diameter and 52 in long was a very hard task. Making prismatic fuel elements with tungsten removed that coating requirement but fabrication of long, full length fuel elements has been shown to also be a difficult task.

The DUMBO concept was put forth in 1957. At the time, many researchers felt it was a superior concept to the prismatic fueled KIWI reactors. The basis of the concept was to stack circular plates of fuel. The plates have a central hole and are surrounded by a plenum. Each plate had a corrugated structure as shown in FIG. 1. Stacking the plates formed the flow channels and the hydrogen coolant flowed down the central axis and through the flow channels, i.e. a folded flow configuration. Cold gas, about 220° K, would flow outwardly through the flow channels of the corrugated plates, thereby heating up. Hot gas, about 2,500° K, would then flow downwardly along the outside of the core down to the nozzle. The surface of the plates could be coated if required; however, the corrugated structure of the plates made it difficult to coat the entire surface.

The performance of the DUMBO was estimated to equal to or exceed the prismatic fueled engines with an Isp of 850 s but with a much higher thrust-to-weight ratio of 20. The ratio of length to diameter of the DUMBO core was also optimal for neutronics whereas the NERVA engines tended to be too long.

The advantage of the graphite based fuel in a NERVA engine is that the fission produced neutrons are moderated to lower energies. This increases the probability of fissions in surrounding uranium. More specifically, neutrons produced by fission of U-235 have an average energy of 1 MeV. The cross section for induced further fissions in surrounding uranium nuclei is around 1.5 barns. But if the neutron is allowed to scatter off of nearby light nuclei such as hydrogen, beryllium or carbon, the energy will be reduced down to thermal energies and the cross section for fission increases to 512 barns. Thus, less uranium is needed in the fuel and smaller reactor cores could be made critical.

Although graphite is not the best material to use as a moderator, it has a very high melting point. Consequently, the present invention may employ plates of moderator material interleaved with the fuel plates. The relative thickness of moderator to fuel will need to be determined. By using the graphite elements but unloaded, i.e. containing no uranium, as moderator elements, a significant reduction in the amount of uranium in the tungsten fuel can be realized. Additionally, moderator material can be placed outside of the fuel plate stack if desired.

Moderation of the neutron energy is achieved by scattering off of surrounding nuclei and loosing energy to the nucleus. In essence, the best moderator is hydrogen because up to ½ the neutron energy is lost in each collision. However, Be and C are also effective. Thus, a good moderator is one that has a high scattering cross section, low mass nuclei, and a low absorption cross section The Moderator Ratio (MR) is defined as the ratio of the scattering to the absorption cross sections. Table 1 lists the MR for several materials. From the table, graphite and beryllium are good candidates. In addition, graphite and BeO are solid at temperatures above 2,500 K.

TABLE 1

| Moderator Ratio for Various Materials | |
| --- | --- |
| Material | MR |
| $H_2O$ | 62 |
| He | 51 |
| Be | 126 |
| C | 216 |

The present invention combines the positive attributes of each fuel form into an innovative design that diminishes the weaknesses of each fuel form. The present invention also discloses a core design that has a simple architecture wherein no manifold is required, reduces operational risk by having no tie-tubes, requires a modest amount of LEU, reduces the number of components (e.g. end caps, tie-tubes, feedlines) to reduce cost, produces clean exhaust (i.e. no emission of radioactive fission products or uranium fuel), is affordable, and has a fuel form that can be readily manufactured with high quality control.

The present invention uses a stack of thin plates of fuel which have grooves/channels (some radial, some curved) etched into the top surface. The size of the channels, number of channels, and thickness of the plate can be varied to match power density. The coolant flow is a folded flow path similar to the particle bed reactor but the solid fuel form solves the problems of matching the power density. The flat plate fuel element allows extreme ease of manufacture and allows coatings to be easily applied if needed.

The basis of the invention herein will utilize LEU loaded tungsten fuel. This will allow retention of all radioactivity and clean exhaust. Clean exhaust will enable much more affordable ground based testing facilities to be considered. Separating each fuel plate will be graphite composite plates. These will be unloaded graphite which will moderate neutrons and provide a more thermal neutron spectrum. By providing a more moderated neutron spectrum, much less LEU will be required in the tungsten fuel. In the event the graphite elements crack or erode, no radioactivity or fuel is lost to the flow stream.

SUMMARY

In accordance with one embodiment of the present invention, a thin fuel plate for a reactor is disclosed. The thin fuel plate comprises: a center flow channel; a fuel region having a plurality of flow channels carved into a top surface of the fuel region; and a coating that covers the fuel region for containing any byproducts.

In accordance with another embodiment of the present invention, a subcore for a reactor is disclosed. The subcore comprises: a housing; and a plurality of stacked sections contained within the housing, each section comprising: a plurality of thin fuel plates; and a moderator plate; wherein each thin fuel plate comprises: a center flow channel; a fuel region having a plurality of flow channels carved into at least one of a top surface and a bottom surface of the fuel region; and a coating that covers the fuel region for containing any byproducts. In accordance with one embodiment of the present invention, a reactor core is disclosed. The reactor core comprises: a plurality of subcores that are spaced apart by up to about 30 cm, wherein each subcore comprises: a housing; a plurality of stacked sections contained within the housing, each section comprising: a plurality of thin fuel plates; and a moderator plate; and an outer graphite sheath surrounding the stacked sections of the subcore; wherein each thin fuel plate comprises: a center flow channel; a cermet fuel region having a plurality of flow channels carved into at least one of a top surface and a bottom surface of the fuel region; and a tungsten coating that covers the fuel region for containing any byproducts; and wherein additional moderator material is placed between the subcores.

BRIEF DESCRIPTION OF THE DRAWINGS

The present application is further detailed with respect to the following drawings. These figures are not intended to limit the scope of the present application, but rather, illustrate certain attributes thereof.

DETAILED DESCRIPTION OF THE INVENTION

Figure 1:
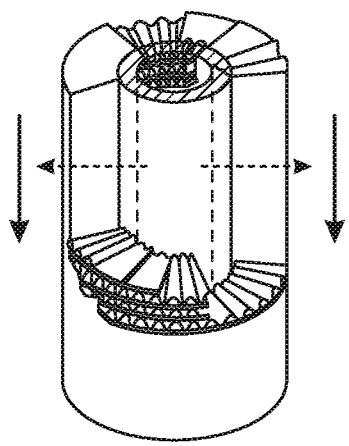
FIG. 1 is a perspective view of a prior art DUMBO reactor fuel element.

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

The thin fuel plate 10 of the present invention may be used in thermal nuclear rockets. In addition to the use in an NTR, the thin fuel plate 10 design can also be used to provide electrical power in a power cycle, can be used to provide thermal heat for melting or other uses, nuclear thermal propulsion, nuclear electric propulsion, surface power, or for life support. The thin fuel plate 10 allows for easier manufacturing and coating than the typical prismatic fuel form. The customizability of the shape, length, width, and number of flow channels 16 also provides superior temperature leveling capabilities, potentially allowing for a near constant temperature throughout the volume of the engine.

The engine is formed by creating plates 10 and stacking them together to form a single core, or multiple subcores 100. The core(s) forms a critical assembly and produces thermal power through fission. Propellant can flow radially outward or inward to extract heat and provide thrust. In the invention disclosed herein, the propellant may be pure hydrogen. It would not require an oxidizer because the heat is supplied by the core 200 instead of by combustion. As the propellant passes through the core 200, it heats up and expands and is pushed out the back of the core 200 at high speeds. The propellant usually is stored in a liquid state, but usually because gaseous by the time it enters the engine. It should be clearly understood that other propellants may be used; e.g. helium, argon, or other noble gasses, air or atmospheric $CO_2$.

The temperature profile of this system also allows for uncooled carbon moderator plates 26 to be placed within the subcore(s) 100. Flowing the propellant from the outside in allows for greatly reduced power deposition in to surrounding moderator, thus allowing the use of lower temperature materials outside the subcore(s) 100. Some moderators 26 that can be used with minimal cooling outside the subcores 100 include: carbon, water, lithium hydride, or others.

Figure 2:
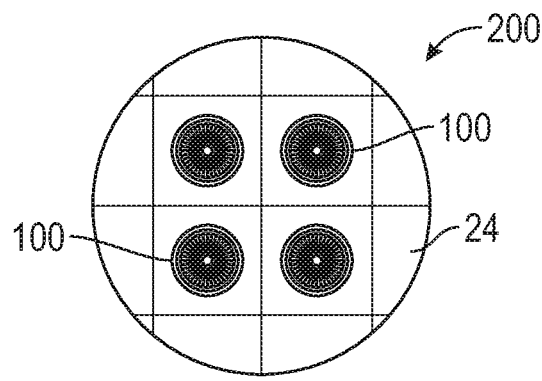
FIG. 2 is top view of four subcores in accordance with one or more embodiments of the present invention, wherein the four subcores are shown spaced apart within a reactor core.

FIGS. 2-14 together, disclose the thin plate fuel 10 form and reactor core 200 therefor. FIG. 2 is a top view of a reactor core 200 of the present invention. Initial estimates of nuclear reactor cores are often performed by homogenizing the materials in the core, i.e. taking the correct amounts of uranium, moderator, and coolant and modeling them as mixed atomistically. Early calculations using Monte Carlo N-Particle Transport Code (MCNP) and this technique quickly showed that the presence of BeO was not beneficial to the reactor core 200 disclosed herein. Thus, graphite may be used as the preferred moderator with a Be reflector. It should be clearly understood, however, that any other suitable materials may be used as moderator and reflector.

Reactor cores 200 of the present invention may have subcores 100 that are positioned close together making the overall diameter of the reactor core 200 to be about six unit lengths. However, the reactor core 200 can be modified by changing the distance between the subcores 100 by spacing them apart and thereby reducing the overall diameter of the reactor core 200 to about three unit lengths. By spacing them out, more moderator material 20 may be placed between the subcores 100, thereby decreasing the amount of external reflector material and thus the overall size of the reactor core 200. According to one embodiment of the present invention, the reactor core 200 may comprise four subcores 100 that are spaced about 20 cm apart from each other. The subcores 100 may be spaced apart from anywhere between 0 cm to about 30 cm, or any other suitable distance that still allows neutrons from one subcore 100 to reach another subcore 100. The beryllium reflector may have an outer diameter of about 62 cm. The beryllium reflector may have an outer diameter that ranges between about 60 cm to about 90 cm. Essentially, the beryllium reflector can be as large as is needed, but may experience diminishing returns as the outer material does not have as much of an effect as the inner. The height of the reactor core 200 may be about 55.8 cm. The height of the reactor core 200 may be bigger and may range between about 55 cm to about 60 cm.

Construction of thin fuel plates 10 can be done a number of ways. For high temperature materials it may be necessary to use a spark plasma sintering (SPS) furnace. It may also be possible to use hot isostatic pressing (HIP) in some cases. Features may also be etched, created by impressed wires, carved with an electron beam or lasers, or milled, ground, or carved with traditional machinery.

The thin plate fuel 10 (whether flat or curved in form) was designed to be stacked on top of others and added to a carbon moderator plate 26 to form a "section 11," and a number of sections 11 would be stacked to form a subcore 100. Subcores 100 would then be placed together and surrounded by a moderator material 20 to achieve criticality. The thin plate fuel 10 according to one or more embodiments may have the following parameters:

TABLE 2

Thin Plate Fuel Parameters

| Parameter | Value |
| --- | --- |
| Disc Thickness | 0.305 cm |
| Disc Inner Radius | 3 cm |
| Disc Outer Radius | 10.16 cm |
| Flow Channel Shape | Semicircle |
| Flow Channel Diameter | 0.254 cm |
| Flow Channel Depth | 0.127 cm |
| Number of Flow Channels | 20 |

Figure 3:
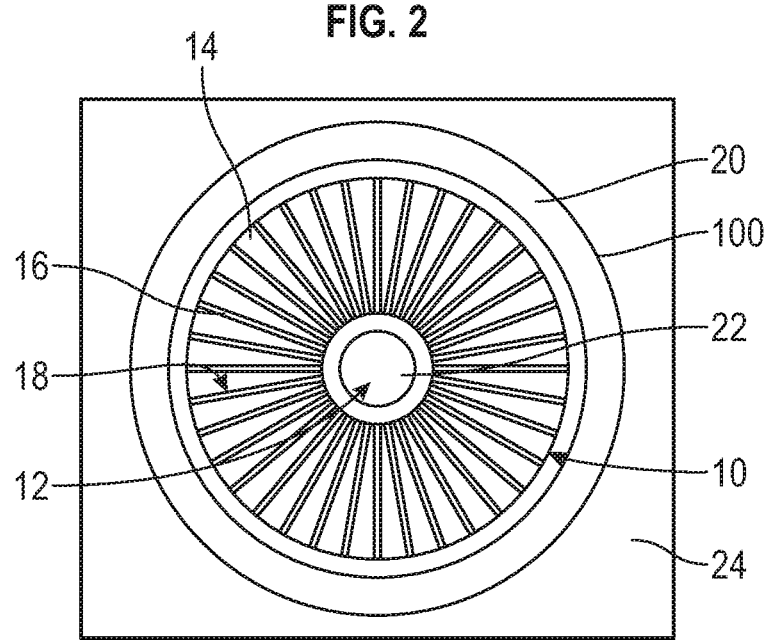
FIG. 3 is one subcore of FIG. 2 in accordance with one or more embodiments of the present invention.

FIG. 3 is a top view of an embodiment of a single thin fuel plate 10 of the present invention. As shown in this example, because the flow is inside out, hot gas will not be present in the center flow channel 12; therefore, there may be about a 2 cm radius Be or C rod 22 running through the center of the center flow channel 12. Substantial benefit may also be derived if the Be or C rod 22 had a radius of between about 1 cm to about 2.5 cm. This helps to increase reactivity in the cermet fuel region 14. The center flow channel 12 may have a round shape, a square shape, or any other suitable shape. The fuel region 14 extends from a radius of about 2 cm-4 cm (preferably 3 cm) to a radius of about 5 cm-15 cm (preferably 10.16 cm) and may have about 20-40 (preferably 36) radial hydrogen channels 16. The fuel regions 14 are preferably clad in about a 100 micrometer Tungsten coating 18. The Tungsten coating may range anywhere between 50-100 micrometers. The outer graphite sheath 20 may have an inner radius of about 10.5 cm-12 cm (preferably 11.16 cm) and an outer radius of about 12 cm-14 cm (preferably 13.16 cm). The graphite sheath 20 region protects the outer Be region 24 from thermal damage as the outer annular region is the hot portion of the hydrogen channel 16. Each subcore 100 is composed of sections 11 that contain a graphite layer 26 of between 0 cm to about 8 cm (preferably 6 cm) and a set of six fuel plates 10 that are about 0.3 cm thick. There may be eleven sections 11 in the subcore 100 with an extra graphite layer 26 at the top of the subcore 100 to help with axial reflection. These configurations are variable; for example, a subcore 100 may have 10-12 sections 11 that comprise a graphite layer 26 and set of 4-6 fuel plates 10 that are 0.2 cm-0.4 cm thick. The graphite portions 26 of each section 11 may be exactly the same geometry as the fuel regions 14 except there are no hydrogen channels 16. The thin fuel plates 10 and graphite sections 26 may all be contained within a housing 30 that helps to control gas flow. And outside of the housing 30 there may be surrounding moderator 20 or reflector material.

The material volume and mass properties of the reactor core 200 may be as follows:

TABLE 3

Reactor Core Volumes

| Material | Volume [cm³] |
|---|---|
| Be | 1,291,874 |
| Graphite | 151,335 |
| H² | 40807 |
| Cermet | 41,553 |
| W (coatings) | 3,572 |
| Total Volume | 1,529,141 |

TABLE 4

Reactor Core Masses

| Material | Mass [kg] |
|---|---|
| Be | 2377.0 |
| Graphite | 276.9 |
| Cermet | 581.7 |
| W (coatings) | 68.8 |
| Total Mass | 3304.5 | k-eigenvalue = 1.0492 +− 13 pcm

With this configuration, there is clear power peaking on the outer edge of the fuel plate 10, in the center flow channel 12 of the subcore 100, and biased in one direction.

Figure 4:
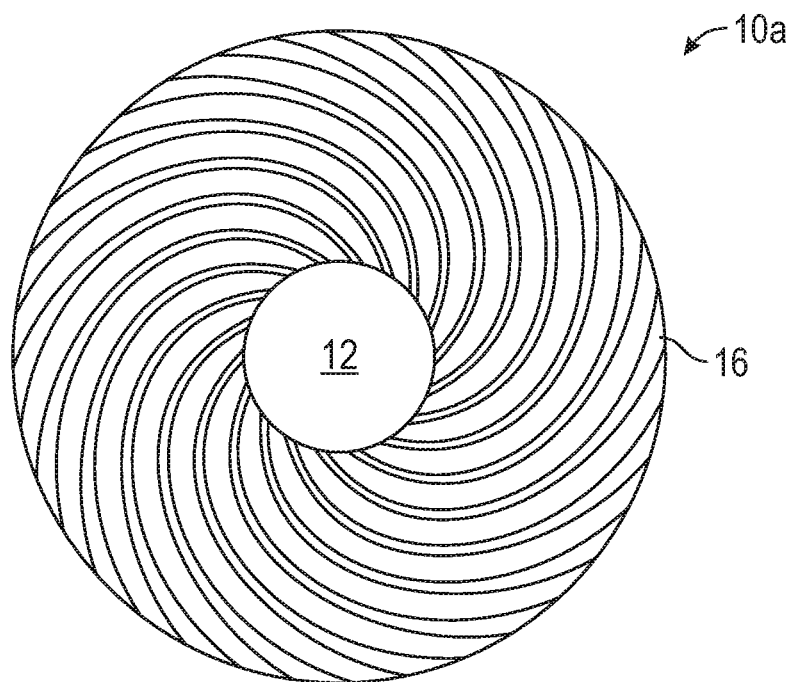
FIG. 4 is a top view of a fuel plate in accordance with one or more embodiments of the present invention.
Figure 5:
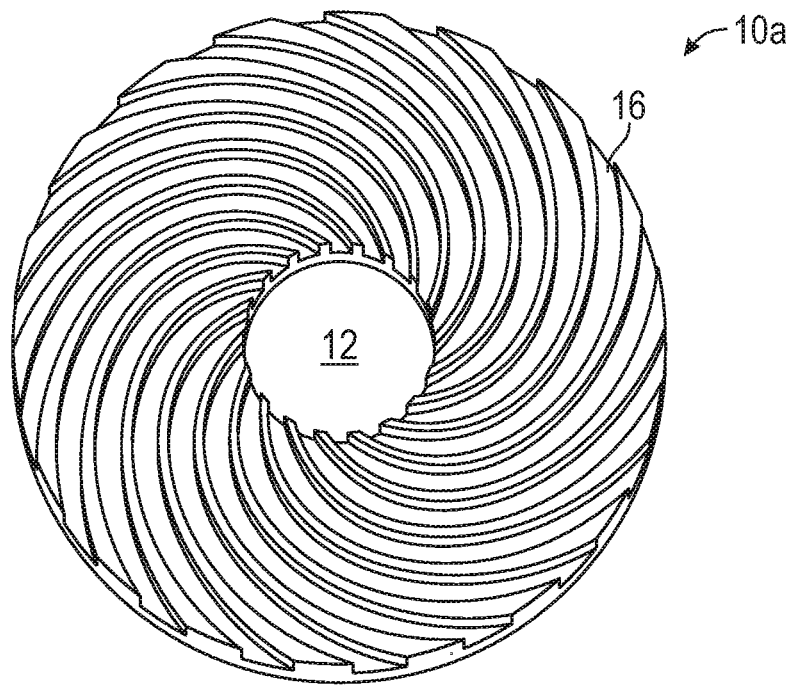
FIG. 5 is a perspective view of the fuel plate of FIG. 4.

FIGS. 4-5 show one embodiment of the thin fuel plate 10a, referred to generically as thin fuel plate 10, of the present invention. In this embodiment, the thin fuel plate 10a may be about 3 mm thick with an outer radius of about 10 cm and an inner radius of about 3 cm. Substantial benefit may also be derived from the use of thin fuel plates 10a that are about 3 mm thick with an outer radius of about 8 cm-12 cm and an inner radius of about 2 cm-4 cm. In this embodiment, the flow channels 16 are curved and there is a slight expansion of the width of the flow channels 16 as it approaches the outer perimeter; i.e. the width of the flow channels 16 are narrow (e.g. 0.2 cm-0.3 cm) proximate the center flow channel 12 and become wider toward the outer perimeter. Having curved flow channels 16 allows for more of the available area of the thin fuel plate 10a to be covered by flow channels 12. Having more of the thin fuel plate 10a exposed to flow channel area increases heat transfer capabilities; typically, more surface area for the heat exchanger is preferred. Curved flow channels 12 also increase the length of the flow path, thereby allowing for better heat exchange.

Varying the width of wall and/or flow channel 12 helps to increase or decrease heat exchange capabilities at certain points on the thin fuel plate 10. For example, the outer perimeter of the thin fuel plate 10 may experience higher power generation levels, and would need wide flow channels 12 to extract heat. Or, the inner perimeter of the thin fuel plate 10 may have geometric concerns that require the channels 12 to thin. Varying thickness of the channels 12 to level out hot spots helps to level out the temperature profile and increase performance.

Figure 6:
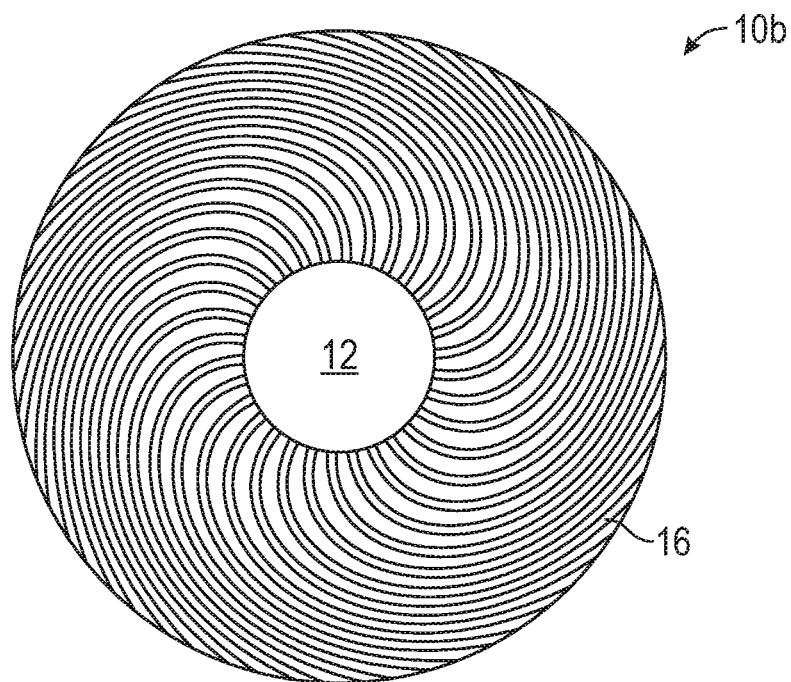
FIG. 6 is a top view of a fuel plate in accordance with one or more embodiments of the present invention.

FIG. 6 shows another embodiment of the thin fuel plate 10b, referred to generically as thin fuel plate 10, of the present invention. In this embodiment, the thin fuel plate 10b may be about 3 mm thick with an outer radius of about 10 cm and an inner radius of about 3 cm. Substantial benefit may also be derived from the use of thin fuel plates 10b that are about 3 mm thick with an outer radius of about 8 cm-12 cm and an inner radius of about 2 cm-4 cm. In this embodiment, the width of the flow channels 16 may be constant; i.e. the width of the flow channels 16 are the same proximate the center flow channel 12 as they are toward the outer perimeter.

Figure 7:
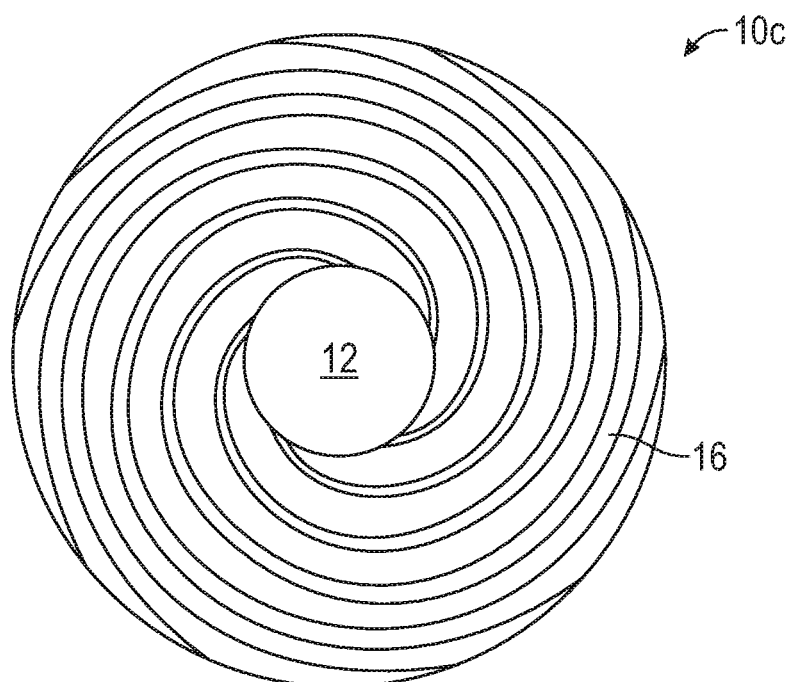
FIG. 7 is a top view of a fuel plate in accordance with one or more embodiments of the present invention.

FIG. 7 shows another embodiment of the thin fuel plate 10c, referred to generically as thin fuel place 10, of the present invention. In this embodiment, the thin fuel plate 10c may be about 3 mm thick with an outer radius of about 10 cm and an inner radius of about 3 cm. Substantial benefit may also be derived from the use of thin fuel plates 10c that are about 3 mm thick with an outer radius of about 8 cm-12 cm and an inner radius of about 2 cm-4 cm. The number of flow channels 16 may vary. In this embodiment, there are fewer flow channels 16 that that shown in the embodiment of FIGS. 4-5. Varying the number of flow channels 16 can be done to accommodate a number of factors, mostly regarding manufacturing. It may be easier to make a few large flow channels, or perhaps the equipment is available to make a large number of thin ones. The number and size of the channels 16 will also have an effect on the heat transfer capabilities and may change based on materials or performance characteristics.

Figure 8:
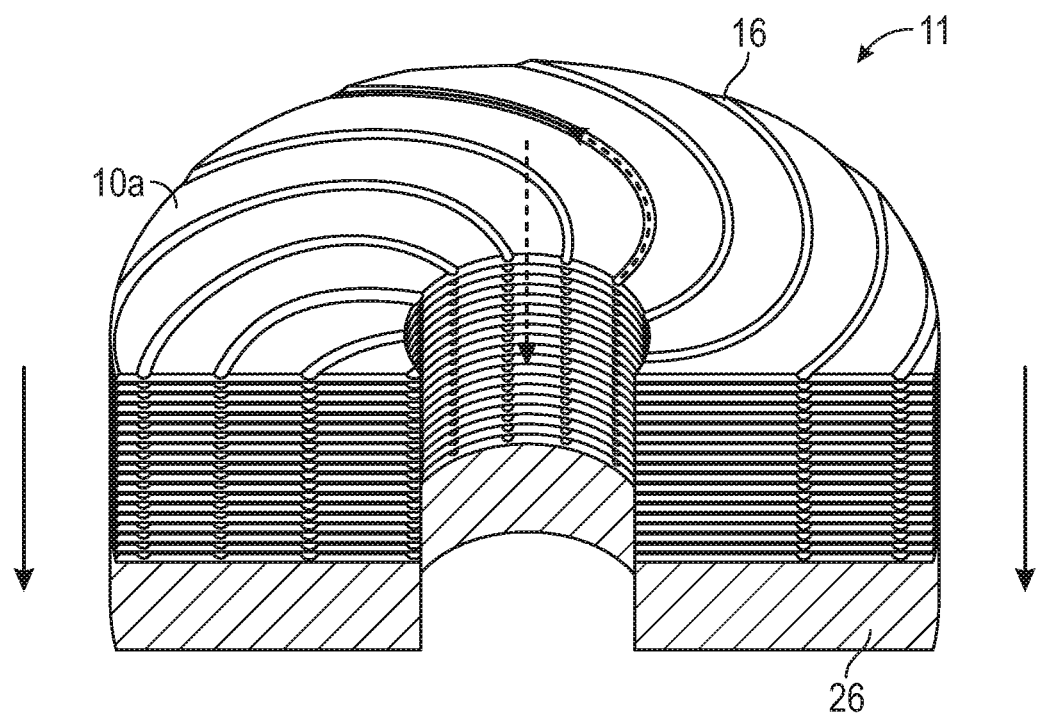
FIG. 8 is a perspective cross-sectional view of a section of a subcore comprising a stack of fuel plates like that shown in FIG. 4 and a moderator plate, wherein cold propellant flows through the center channel of the stack, heats up as it passes outwardly through the channels of the fuel plates, and hot propellant flows along the outside of the stack.
Figure 9:
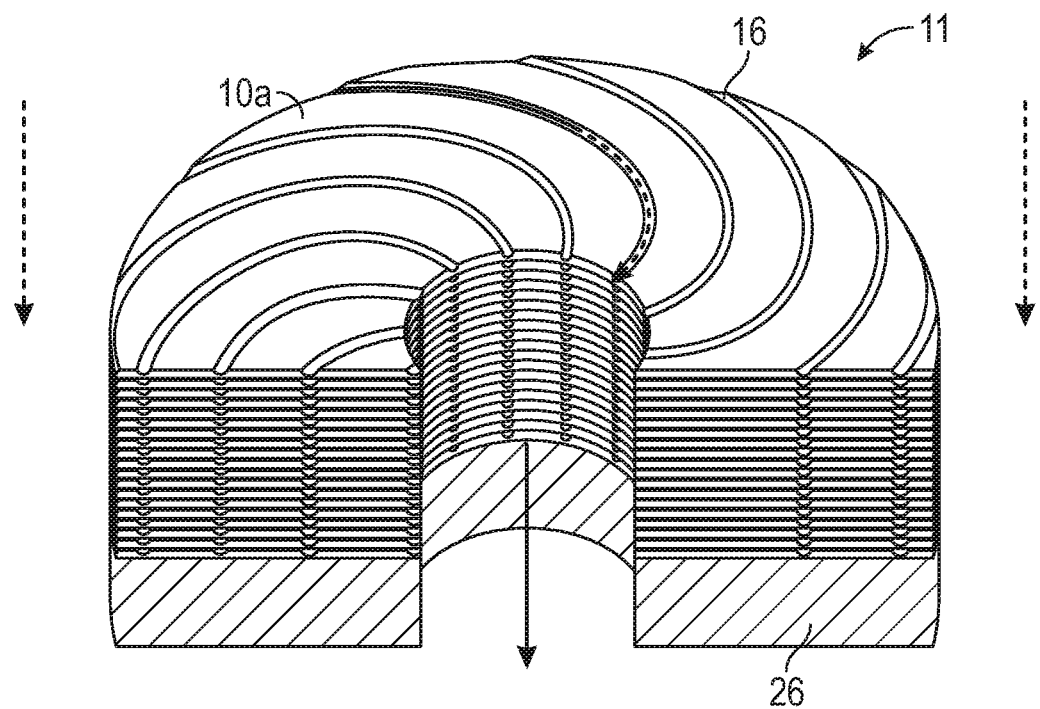
FIG. 9 is perspective cross-sectional view of a section of a subcore comprising a stack of fuel plates like that shown in FIG. 4 and a moderator plate, wherein cold propellant flows along the outside of the stack, heats up as it passes inwardly through the channels of the fuel plates, and hot propellant flows through the center channel of the stack.

FIGS. 8-9 show a section 11 of a subcore 100 comprising a stack of thin fuel plates 10a, like that shown in FIG. 4, with a moderator plate 26 at the bottom of the stack. In FIG. 8, cold propellant flows through the center flow channel 12. The propellant heats as it flows outwardly through the channels 16 of the thin fuel plates 10a. Hot propellant then exits the channels 16 and flows along the outside of the subcore 100. In FIG. 9, cold propellant flows along the outside of the subcore 100. The propellant heats as it flows inwardly through the channels 16 of the thin fuel plates 10a. Hot propellant then exits the channels 16 and flows through the center flow channel 12.

Figure 10:
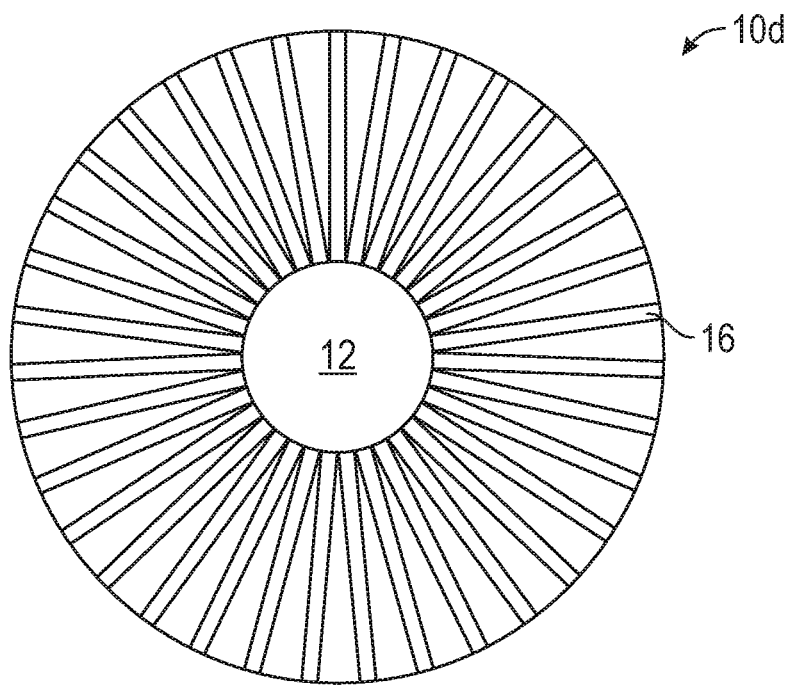
FIG. 10 is top view of a fuel plate in accordance with one or more embodiments of the present invention.

FIG. 10 shows a thin fuel plate 10d, referred to generically as thin plate fuel 10, in accordance with at least one embodiment of the present invention. In this embodiment, the thin plate fuel 10d is shown with radial channels 16.

Figure 11:
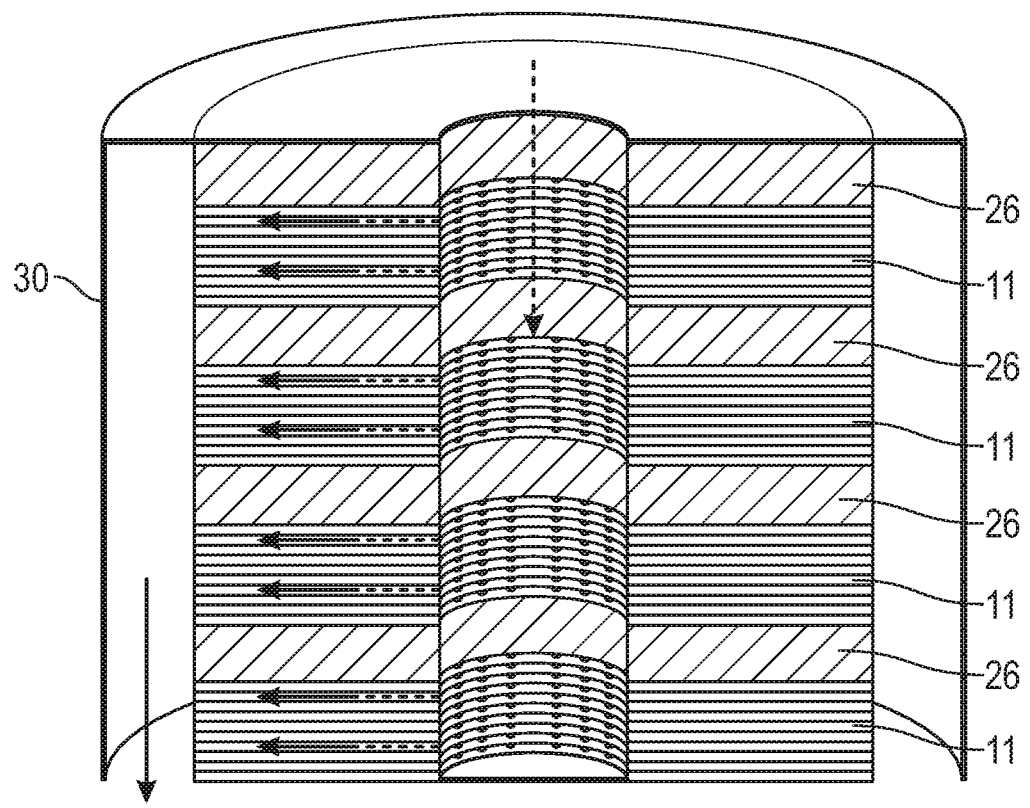
FIG. 11 is a perspective cross-sectional view of a subcore using fuel plates like that shown in FIG. 10, wherein cold propellant flows through the center channel of the stack of fuel plates, heats up as it passes outwardly through the channels of the fuel plates, and hot propellant flows along the outside of the stack, and wherein moderator plates separate the stacks of fuel plates.
Figure 12:
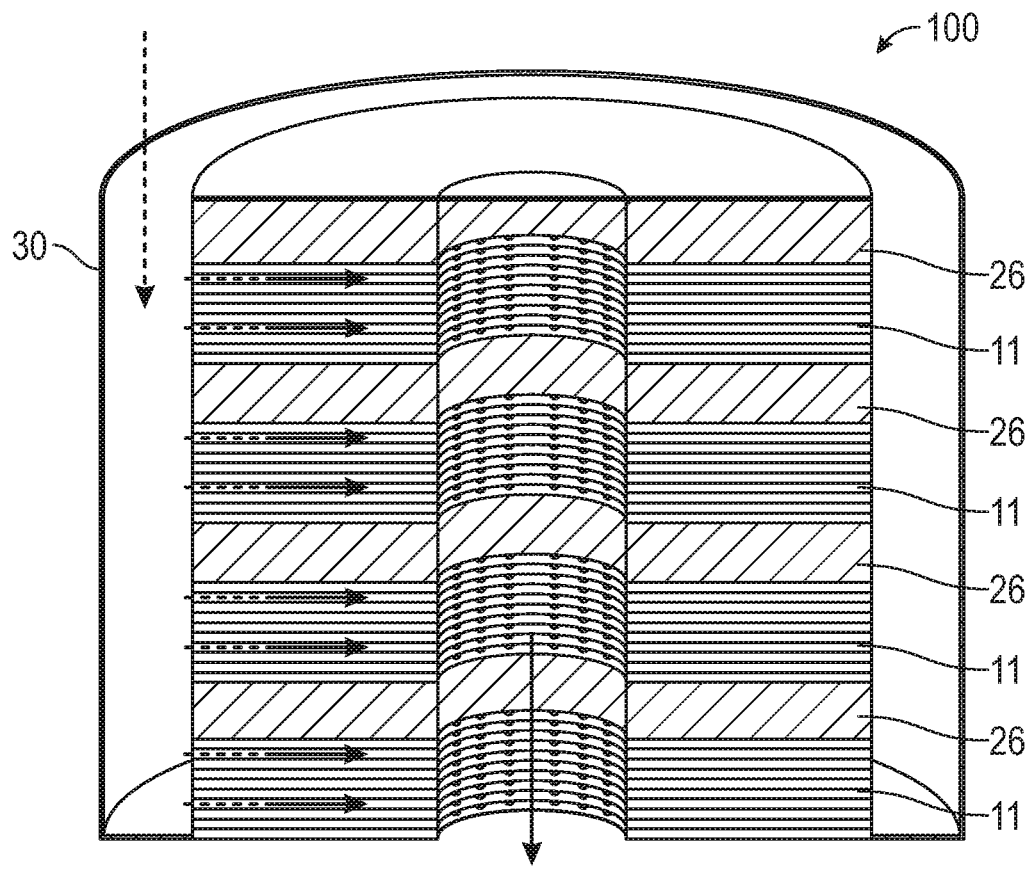
FIG. 12 is a perspective cross-sectional view of a subcore using fuel plates like that shown in FIG. 10, wherein cold propellant enters along the outside of the stack, heats up as it passes inwardly through the channels of the fuel plates, and hot propellant flows through the center channel of the stack, and wherein moderator plates separate the stacks fuel plates.

FIGS. 11-12 show a subcore 100 comprising several stacks of thin fuel plates 10d, like that shown in FIG. 10, with moderator plates 26 in between the stacks. It should be clearly understood that substantial benefit may still be derived in no moderator plates 26 are present between the stacks. The subcore 100 shows that the stacks of thin fuel plates 10d and the moderator plates 26 are contained within a housing 30 that helps to control gas flow. The outer region of the subcore 100, outside of the housing 30, may contain moderator 20 or reflector materials. In FIG. 11, cold propellant enters through the center flow channel 12. The propellant heats as it flows outwardly through the channels 16 of the thin fuel plates 10d. Hot propellant then exits the channels 16 and flows downwardly along the outer region of the subcore 100 within the housing 30 toward the nozzle. In FIG. 12, cold propellant enters the outer region of the subcore 100 within the housing 30. The propellant heats as it flows inwardly through the channels 16 of the thin fuel plates 10d. Hot propellant then exits the channels 16 and flows downwardly through the center flow channel 12 toward the nozzle.

Figure 13:
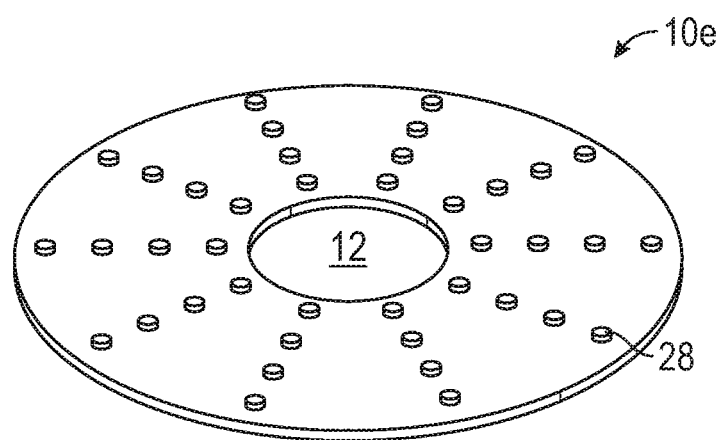
FIG. 13 is a top perspective view of a fuel plate in accordance with one or more embodiments of the present invention.

FIG. 13 shows another embodiment of the thin fuel plate 10e, referred to generically as thin fuel plate 10, of the present invention. In this embodiment, the thin fuel plate 10e may be about 3 mm thick with an outer radius of about 10 cm and an inner radius of about 3 cm. Substantial benefit may also be derived from the use of thin fuel plates 10e that are about 3 mm thick with an outer radius of about 8 cm-12 cm and an inner radius of about 2 cm-4 cm. In this embodiment, there are a plurality of spacers 28 formed on the top surface of the thin fuel plate 10e. The spacers 28 are shown to be circular, but the spacers 28 may have any suitable shape. The spacers 28 are positioned in radial lines but it should be understood that they can be positioned in any suitable configuration. The spacers 28 keep the thin fuel plates 10e separated when they are stacked so that propellant may flow between the plates 10e. The flow between the spacers 28 would still be horizontal. The spacers 28 increase the ratio of flow channels to fuel material.

Figure 14:
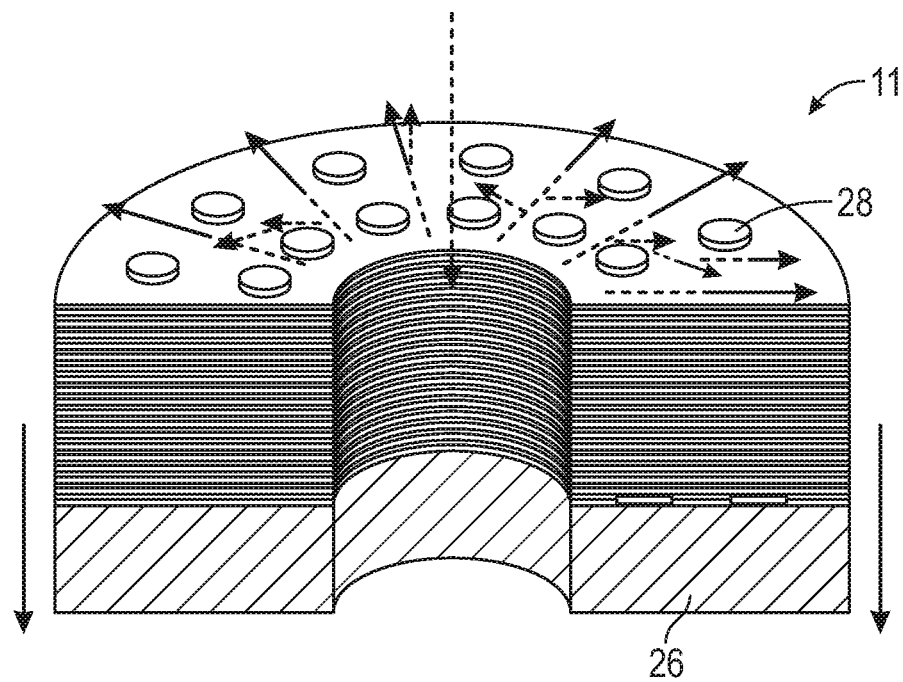
FIG. 14 is a perspective cross-sectional view of a subcore comprising a stack of fuel plates like that shown in FIG. 13 and a moderator plate, wherein cold propellant flows through the center channel of the stack of fuel plates, heats up as it passes outwardly through the channels of the fuel plates, and hot propellant flows along the outside of the stack.

FIG. 14 shows a section 11 of a subcore 100 comprising a stack of thin fuel plates 10e, like that shown in FIG. 13, with a moderator plate 26 at the bottom of the stack. Cold propellant flows through the center flow channel 12. The propellant heats as it flows outwardly in between the spacers 28 of the thin fuel plates 10e. Hot propellant then exits and flows along the outside of the subcore 100. Conversely, cold propellant can flow along the outside of the subcore 100, the propellant can become heated as it flows through inwardly in between the spacers 28 of the thin fuel plates 10e, and hot propellant can then exit through the center flow channel 12.

Figure 15:
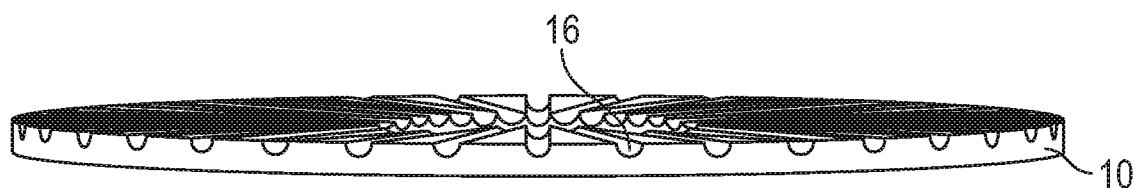
FIG. 15 is a side perspective view of the fuel plate of FIG. 10, wherein flow channels are present on only one side of the fuel plate.

The thin fuel plates 10 may have channels 16 formed on only the top surface of the thin fuel plate 10, as shown in FIG. 15. Alternatively, as shown in FIG. 16, the thin fuel plates 10f, referred to generically as thin fuel plate 10, may have channels 16 formed on both the top surface and the bottom surface of the thin fuel plate 10f.

Figure 16:
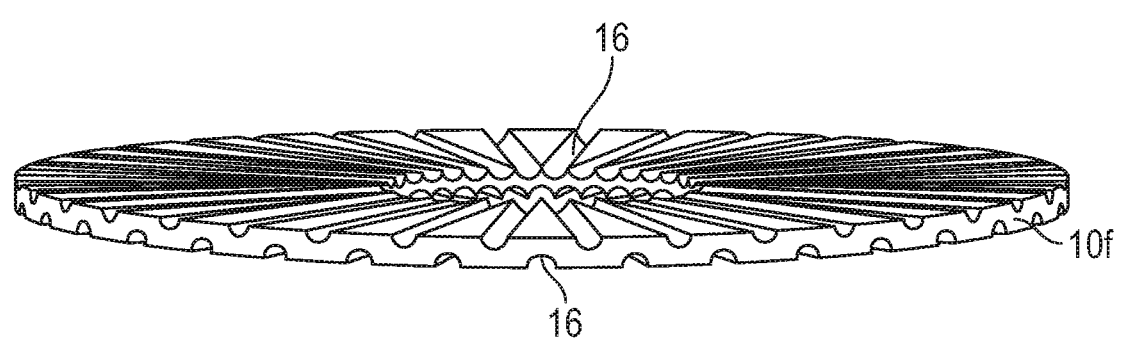
FIG. 16 is a side perspective view of a fuel plate in accordance with one or more embodiments of the present invention, wherein flow channels are present on both sides of the fuel plate.
Figure 17:
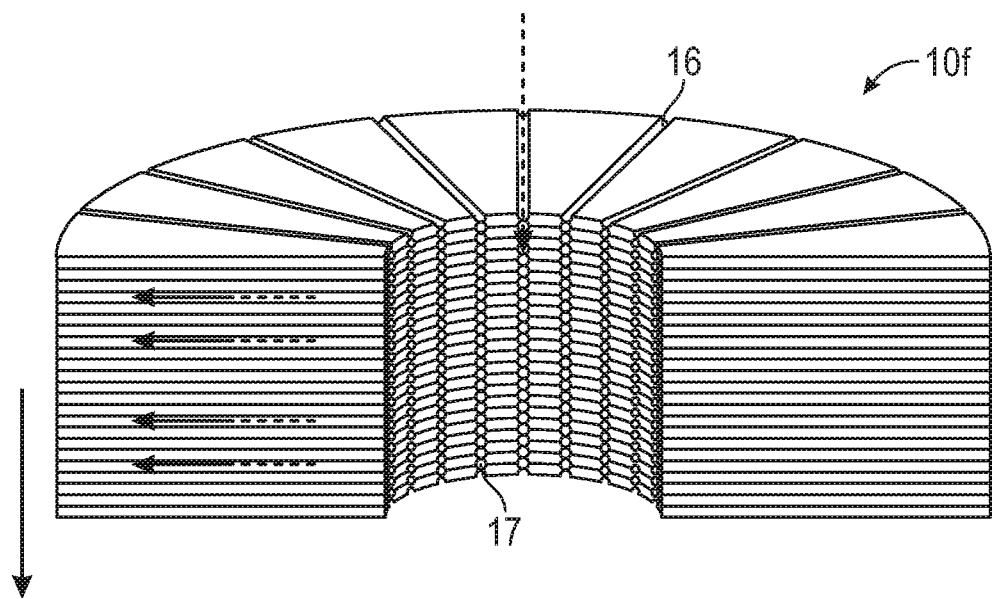
FIG. 17 is a perspective cross-sectional view of a stack of fuel plates like that shown in FIG. 10, wherein cold propellant flows through the center channel of the stack, heats up as it passes outwardly through the channels of the fuel plates, and hot propellant flows along the outside of the stack.
Figure 18:
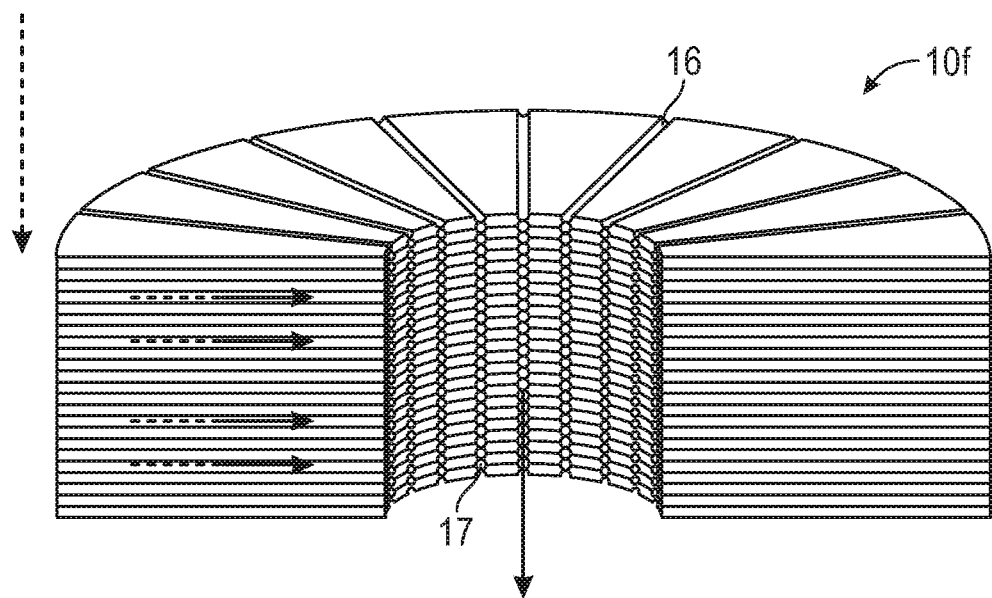
FIG. 18 is a perspective cross-sectional view of a stack of fuel plates like that shown in FIG. 10, wherein cold propellant enters along the outside of the stack, heats up as it passes inwardly through the channels of the fuel plates, and hot propellant flows through the center channel of the stack.

FIGS. 17-18 show a stack of thin fuel plates 10f, like that shown in FIG. 16. The channels 16 on the bottom surface of one thin fuel plate 10f may be lined up with the channels 16 on the top surface of the thin fuel plate 10f beneath it, thereby forming a larger combined channel 17. Alternatively, the channels 16 on the bottom surface of one thin fuel plate 10f may be off-set from the channels 16 on the top surface of the thin fuel plate 10f beneath it, thereby creating a greater number of channels 16 than there would be if the channels 16 were aligned. In FIG. 17, cold propellant flows through the center flow channel 12. The propellant heats as it flows outwardly through the combined channels 17 of the thin fuel plates 10f. Hot propellant then exits the combined channels 17 and flows along the outside of the subcore 100. In FIG. 18, cold propellant flows along the outside of the subcore 100. The propellant heats as it flows inwardly through the combined channels 17 of the thin fuel plates 10f. Hot propellant then exits the combined channels 17 and flows through the center flow channel 12.

Figure 19:
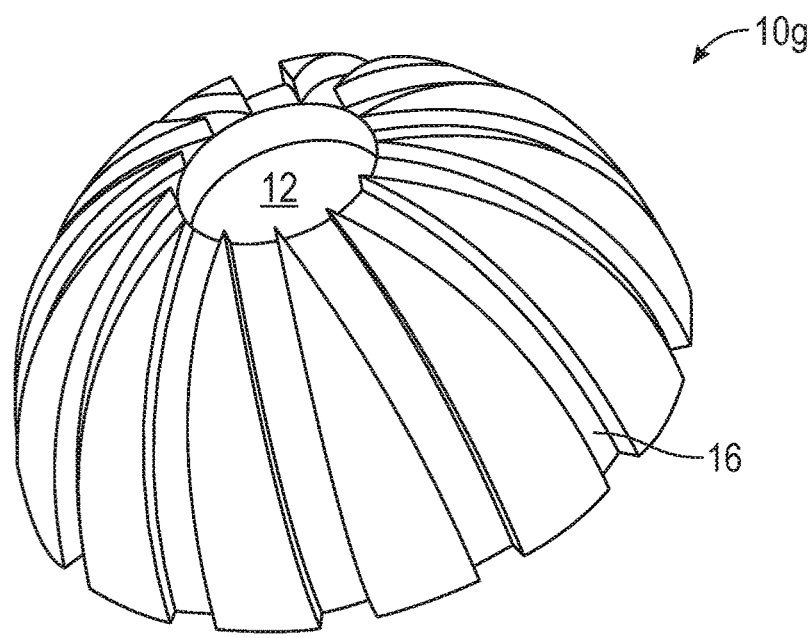
FIG. 19 is a top perspective view of a fuel plate in accordance with one or more embodiments of the present invention.

FIG. 19 shows another embodiment of the thin fuel plate 10g, referred to generically, as thin fuel plate 10, of the present invention. In this embodiment, the thin fuel plate 10g may be curved. These thin fuel plates 10g would likely have similar dimensions as the other thin fuel plates 10 described herein, only the thin fuel plate 10g is curved.

Figure 20:
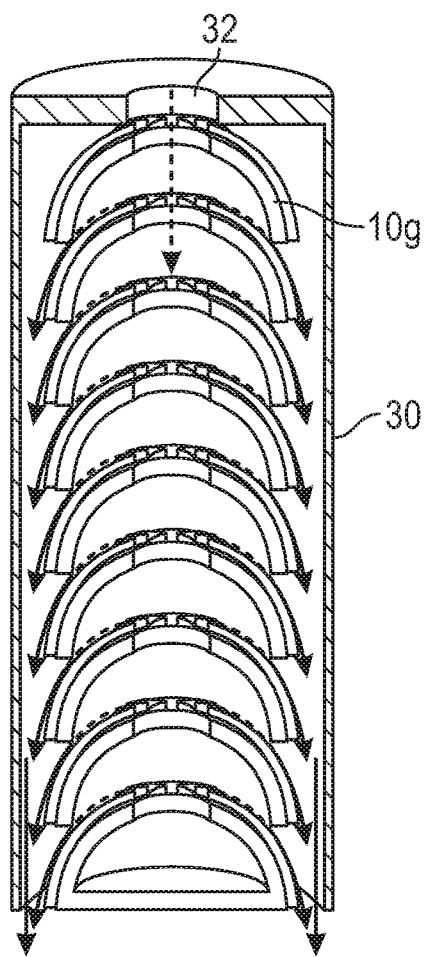
FIG. 20 is a perspective cross-sectional view of a subcore comprising a stack of fuel plates like that shown in FIG. 19, wherein cold propellant flows through the center channel of the stack, heats up as it passes outwardly through the channels of the fuel plates, and hot propellant flows along the outside of the stack.
Figure 21:
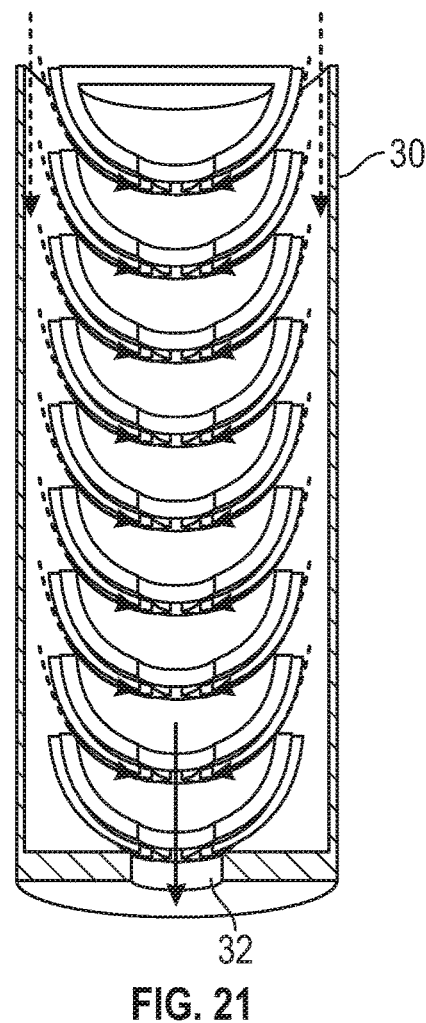
FIG. 21 is a perspective cross-sectional view of a subcore comprising a stack of fuel plates like that shown in FIG. 19, wherein cold propellant enters along the outside of the stack, heats up as it passes inwardly through the channels of the fuel plates, and hot propellant flows through the center channel of the stack.

FIGS. 20-21 show a stack of thin fuel plates 10g, like that shown in FIG. 19 within a housing 30. In FIG. 20, cold propellant flows through an aperture 32 in the middle of the housing 30 and flows outwardly through the channels 16 of the plates 10g toward the outer walls. The propellant heats as it flows outwardly through the channels 16 of the thin fuel plates 10g. Hot propellant then exits the channels 16 and flows along the outside of the subcore 100 within the housing 30. In FIG. 21, cold propellant flows along the outside of the subcore 100 within the housing 30. The propellant heats as it flows inwardly through the channels 16 of the thin fuel plates 10g. Hot propellant then exits the channels 16 and flows through the center flow channel 12 and exits the aperture 32 of the housing 30.

Figure 22:
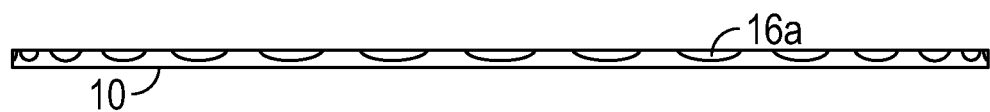
FIG. 22 is a side view of a fuel plate in accordance with one or more embodiments of the present invention, wherein the flow channels are curved.
Figure 23:
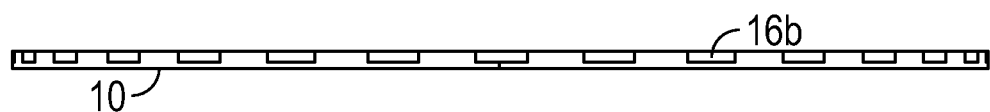
FIG. 23 is a side view of a fuel plate in accordance with one or more embodiments of the present invention, wherein flow channels are flat.

As shown in FIGS. 22-23, the profile of the flow channels 16 may vary. In FIG. 22, the flow channels 16a, referred to generically as flow channel 16, may have a rounded shape. Or, as shown in FIG. 23, the flow channels 16b, referred to generically as flow channel 16, may be square or rectangular. It should be clearly understood that the flow channels 16 may have any suitable shape. By changing the constant diameter semi-circular cross section (FIG. 22) of the channels 16a to a more square or rectangular shape channel 16b (FIG. 23), the size of the channels 16b are able to increase as they spiraled outward.

Figure 24:
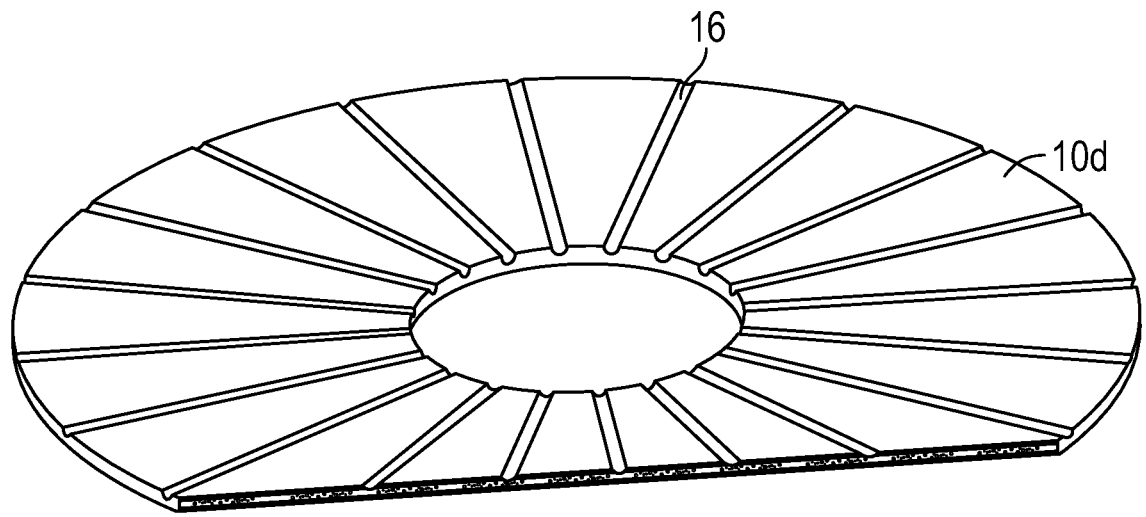
FIG. 24 is a perspective partial cut-away view of the fuel plate of FIG. 10.
Figure 24:
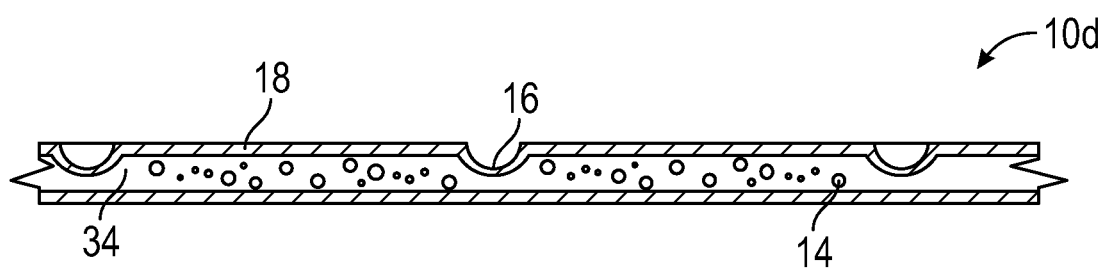

Referring to FIG. 24, the thin fuel plate 10d, and all other embodiments of the thin plate fuel 10 disclosed herein, are designed to be composed of a fuel material 14 embedded within a matrix material 34, with the entire unit having a coating 18 comprised of another material to contain any byproducts, prevent reactions with the working fluid, and potentially provide structural support.

Possible materials for plate construction, by themselves or in any combination thereof are as follows:

| Fuels | Matrix Materials | Coatings |
|---|---|---|
| Natural uranium metal | Tungsten | Tungsten |
| Depleted uranium | Tantalum | Tantalum |
| Enriched uranium (LEU or HEU) | Iridium | Zirconium carbide |
| Plutonium | Hafnium | Niobium carbide |
| Thorium | Lithium hydride | Hafnium |

| Fuels | Matrix Materials | Coatings |
|---|---|---|
| Uranium dioxide | Carbon | |
| Uranium nitride | Zirconium carbide | |
| Uranium carbide | Molybdenum | |
| Plutonium dioxide | | |
| Thorium oxide | | |

The foregoing description is illustrative of particular embodiments of the application, but is not meant to be limitation upon the practice thereof. While embodiments of the disclosure have been described in terms of various specific embodiments, those skilled in the art will recognize that the embodiments of the disclosure may be practiced with modifications within the spirit and scope of the claims.

What is claimed is:

1. A fuel plate for a reactor core comprising:
   a center flow channel;
   a fuel region comprising:
      a matrix material;
      a fuel embedded within the matrix material; and
      a plurality of flow channels in a top surface of the fuel region; and
   a coating that covers the matrix material, the fuel, and the plurality of flow channels, that contacts surfaces of the plurality of flow channels without a gap between the coating and the matrix material, and that contains any byproducts.

2. The fuel plate of claim 1 further comprising a plurality of flow channels in a bottom surface of the fuel region.

3. The fuel plate of claim 1 wherein the plurality of flow channels in the top surface have a constant width from the center flow channel to an outer perimeter of the fuel plate.

4. The fuel plate of claim 1 wherein a diameter of the plurality of flow channels in the top surface widens as it approaches an outer perimeter of the fuel plate.

5. The fuel plate of claim 1 wherein the plurality of flow channels in the top surface extend radially from the center flow channel to an outer perimeter of the fuel plate.

6. The fuel plate of claim 1 wherein the plurality of flow channels in the top surface are curved as they extend from the center flow channel to an outer perimeter of the fuel plate.

7. The fuel plate of claim 1 wherein the matrix material is at least one of tungsten, tantalum, iridium, hafnium, lithium hydride, carbon, zirconium carbide, and molybdenum.

8. The fuel plate of claim 1 wherein the fuel is at least one of natural uranium metal, depleted uranium, enriched uranium, plutonium, thorium, uranium dioxide, uranium nitride, uranium carbide, plutonium dioxide, and thorium oxide.

9. The fuel plate of claim 1 wherein the coating is at least one of tungsten, tantalum, zirconium carbide, niobium carbide, and hafnium.

10. The fuel plate of claim 1 wherein the fuel plate is flat.

11. The fuel plate of claim 1 wherein the fuel plate is curved.

12. A subcore for a reactor comprising:
   a housing; and
   a plurality of stacked sections contained within the housing, each section comprising:
      a plurality of fuel plates; and
      a moderator plate;
      wherein each fuel plate of the plurality of fuel plates comprises:
         a center flow channel; and
         a fuel region comprising:
            a matrix material;
            a fuel embedded within the matrix material;
            a plurality of flow channels in at least one of a top surface and a bottom surface of the fuel region; and
         a coating that covers the matrix material and the fuel for containing any byproducts, wherein the coating contacts surfaces of the plurality of flow channels without a gap between the coating and the matrix material.

13. The subcore for the reactor of claim 12 wherein the plurality of flow channels of each said fuel plate of the plurality of fuel plates are curved as they extend from the center flow channel to an outer perimeter of the fuel plate of the plurality of fuel plates.

14. The subcore for the reactor of claim 12 wherein the matrix material is at least one of tungsten, tantalum, iridium, hafnium, lithium hydride, carbon, zirconium carbide, and molybdenum;
   wherein the fuel is at least one of natural uranium metal, depleted uranium, enriched uranium, plutonium, thorium, uranium dioxide, uranium nitride, uranium carbine, plutonium dioxide, and thorium oxide; and
   wherein the coating is at least one of tungsten tantalum, zirconium carbide, niobium carbide, and hafnium.

15. The subcore for the reactor of claim 12 wherein the moderator plate comprises graphite.

16. The subcore for the reactor of claim 12, wherein each said fuel plate of the plurality of fuel plates is 0.2-0.4 cm in thickness.

* * * * *